(12) United States Patent
Khot et al.

(10) Patent No.: US 9,960,413 B2
(45) Date of Patent: *May 1, 2018

(54) LMFP CATHODE MATERIALS WITH IMPROVED ELECTROCHEMICAL PERFORMANCE

(71) Applicant: Dow Global Technologies LLC, Midland, MI (US)

(72) Inventors: Shrikant N. Khot, Midland, MI (US); Deidre A. Strand, San Diego, CA (US); Jamie L. Cohen, Midland, MI (US); Thierry Drezen, Cugy (CH); Steven S. Kaye, San Diego, CA (US); Bin Li, San Diego, CA (US); Murali G. Theivanayagam, Midland, MI (US); Ing-feng Hu, Midland, MI (US); Xindi Yu, Midland, MI (US); Stacie L. Santhany, Auburn, MI (US); Christopher P. Rentsch, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/646,372

(22) PCT Filed: Dec. 20, 2013

(86) PCT No.: PCT/US2013/076780
§ 371 (c)(1),
(2) Date: May 20, 2015

(87) PCT Pub. No.: WO2014/100529
PCT Pub. Date: Jun. 26, 2014

(65) Prior Publication Data
US 2015/0311505 A1    Oct. 29, 2015

Related U.S. Application Data

(60) Provisional application No. 61/740,575, filed on Dec. 21, 2012.

(51) Int. Cl.
| | |
|---|---|
| *H01M 4/00* | (2006.01) |
| *H01M 4/36* | (2006.01) |
| *H01M 4/58* | (2010.01) |
| *H01M 4/62* | (2006.01) |
| *H01M 10/0525* | (2010.01) |
| *C01G 45/12* | (2006.01) |
| *C01B 25/45* | (2006.01) |
| *H01M 4/587* | (2010.01) |
| *H01M 10/052* | (2010.01) |
| *H01M 10/0568* | (2010.01) |
| *H01M 4/02* | (2006.01) |

(52) U.S. Cl.
CPC ............ *H01M 4/364* (2013.01); *C01B 25/45* (2013.01); *C01G 45/1235* (2013.01); *H01M 4/587* (2013.01); *H01M 4/5825* (2013.01); *H01M 4/625* (2013.01); *H01M 10/052* (2013.01); *H01M 10/0525* (2013.01); *H01M 10/0568* (2013.01); *C01P 2002/50* (2013.01); *C01P 2002/52* (2013.01); *C01P 2002/72* (2013.01); *C01P 2006/32* (2013.01); *C01P 2006/40* (2013.01); *H01M 2004/028* (2013.01); *H01M 2220/20* (2013.01); *H01M 2300/0025* (2013.01); *Y02E 60/122* (2013.01); *Y02P 70/54* (2015.11); *Y02T 10/7011* (2013.01)

(58) Field of Classification Search
CPC .... H01M 4/364; H01M 4/5825; H01M 4/587; H01M 4/625; H01M 10/052; H01M 10/0525; H01M 10/0568; H01M 2004/028; H01M 2220/20; H01M 2300/0025; C01B 25/45; C01G 45/1235; Y02E 60/122

See application file for complete search history.

(56) References Cited

U.S. PATENT DOCUMENTS

2012/0301780 A1    11/2012    Kitagawa

FOREIGN PATENT DOCUMENTS

| EP | 1150367 | * 10/2001 | ............. H01M 4/50 |
|---|---|---|---|
| EP | 1150367 A | 10/2001 | |
| EP | 2383820 A | 11/2011 | |
| JP | 2004-063422 A | 4/2004 | |
| JP | 2012-190568 A | 10/2012 | |
| WO | 2017/064934 A | 6/2007 | |
| WO | 2017/018633 A | 2/2008 | |
| WO | 2014/098937 A | 6/2014 | |

OTHER PUBLICATIONS

Fang et al., J. Power Sources 204(2012) 193-196.

* cited by examiner

*Primary Examiner* — Raymond Alejandro

(57) ABSTRACT

Particulate LMFP cathode materials having high manganese contents and small amounts of dopant metals are disclosed. These cathode materials are made by milling a mixture of precursor materials in a wet or dry milling process. Preferably, off-stoichiometric amounts of starting materials are used to make the cathode materials. Unlike other high manganese LMFP materials, these cathode materials provide high specific capacities, very good cycle life and high energies even at high discharge rates.

5 Claims, No Drawings

LMFP CATHODE MATERIALS WITH IMPROVED ELECTROCHEMICAL PERFORMANCE

CROSS-REFERENCE TO RELATED APPLICATIONS

[Not applicable]

STATEMENT REGARDING FEDERALLY SPONSORED RESEARCH OR DEVELOPMENT

[Not applicable]

THE NAMES OF THE PARTIES TO A JOINT RESEARCH AGREEMENT

[Not applicable]

INCORPORATION-BY-REFERENCE OF MATERIAL SUBMITTED ON A COMPACT DISK OR AS A TEXT FILE VIA THE OFFICE ELECTRON FILING SYSTEM

[Not applicable]

STATEMENT REGARDING PRIOR DISCLOSURES BY THE INVENTOR OR A JOINT INVENTOR

[Not applicable]

BACKGROUND OF THE INVENTION

Field of the Invention

The present invention relates to olivine lithium manganese iron phosphate cathode materials for lithium batteries and to methods for making such materials.

Description of Related Art Including Information Disclosed Under 37 CFR 1.97 and 1.98

[Not applicable]

Lithium batteries are widely used as primary and secondary batteries for vehicles and many types of electronic equipment. These batteries often have high energy and power densities.

$LiFePO_4$ is known as a low cost material that is thermally stable and has low toxicity. It can also demonstrate very high rate capability (high power density) when made with a small particle size and a good carbon coating. For these reasons, $LiFePO_4$ has found use as a cathode material in lithium batteries. However, $LiFePO_4$ has a relatively low working voltage (3.4V vs. Li+/Li) and because of this has a low energy density relative to oxide cathode materials. In principle, the working voltage and therefore the energy density can be increased by substituting manganese for some or all of the iron to produce a lithium manganese iron phosphate ($Li_aMn_bFe_{(1-b)}PO_4$ (LMFP)) cathode, without a significant sacrifice of power capability. However, structural stability and charge transport are adversely affected by replacing iron with manganese, and the specific capacities obtained have fallen significantly short of theoretical levels. Energy and power densities also are disappointingly low. In addition, battery cycling performance for LMFP electrodes often is less than desirable, due to a loss of capacity with cycling.

Attempts have been made to improve the performance of olivine lithium transition metal phosphate electrode materials by adjustments to the stoichiometry, i.e., the ratios of lithium, manganese, iron and the phosphate ions. Electrode materials containing an excess of lithium have been described, for example, in WO 2009/144600 and U.S. Pat. No. 7,842,420. Adding certain "dopants", i.e., metals other than lithium, manganese and iron, also has been suggested in LMFP electrode materials having low manganese contents. See, e.g., WO 2011/025823, which mentions cobalt, nickel, niobium and vanadium as the "dopant" materials in an LMFP material in which the value of b is up to 0.6. See also U.S. Pat. No. 8,168,150, in which various other metals are suggested in an LMFP cathode material containing a large amount of iron.

There remains a desire to provide an olivine LMFP cathode material that has good specific capacity, high rate performance, and improved cycling performance.

BRIEF SUMMARY OF THE INVENTION

This invention is in one aspect a cathode material comprising an electroactive material having the empirical formula $Li_aMn_bFe_cD_dPO_4$, wherein
a is a number from 1.025 to 1.15;
b is from 0.65 to 0.95;
c is from 0.049 to 0.349;
d is from 0.001 to 0.1;
$2.75 \leq (a+2b+2c+dV) \leq 3.10$, wherein V is the valence of D, and D is a metal ion selected from one or more of magnesium, calcium, strontium, cobalt, titanium, zirconium, molybdenum, vanadium, niobium, nickel, scandium, chromium, copper, zinc, beryllium, lanthanum and aluminum, and further wherein at least a portion of the electroactive material has an olivine structure.

The invention is also a nanocomposite containing at least 70% by weight of a particulate electroactive material of the invention with up to 30% by weight of graphite, carbon black and/or other conductive carbon.

The LMFP cathode materials of the invention provide enhanced cycle life while retaining good specific capacity and good high rate performance.

In another aspect, the invention is a method for making an olivine lithium manganese iron phosphate cathode material, comprising a) forming a mixture of at least one lithium precursor, at least one iron precursor, at least one manganese precursor, at least one dopant metal precursor and at least one precursor of $H_xPO_4$ ions where x is 0, 1 or 2, wherein the precursors are present in amounts such that:

the mole ratio of lithium ions to $H_xPO_4$ ions is 1.025 to 1.15;

the mole ratio of manganese ions to $H_xPO_4$ ions is 0.65 to 0.95;

the mole ratio of iron ions to $H_xPO_4$ ions is 0.049 to 0.349;

the mole ratio of dopant metal ions to $H_xPO_4$ ions is 0.001 to 0.10; and the mole ratio of lithium, manganese, iron and dopant metal ions combined to $H_xPO_4$ ions is such that $(2.75 \times \text{Moles } H_xPO_4) \leq [\text{moles Li} + (2 \times \text{Moles Mn}) + (2 \times \text{Moles Fe}) + (2 \times \text{Moles Dopant Metal})] \leq (3.10 \times \text{Moles } H_xPO_4)$;

b) milling the mixture and then;

c) calcining the milled mixture to form the olivine lithium manganese iron phosphate cathode material.

Cathode materials made in accordance with the invention offer several important advantages over conventional high-manganese LMFP cathode materials. One important advantage is cycle life. The cathode materials formed in accordance with the invention have been found to exhibit excellent cycle lives. Lithium batteries containing cathodes made from these materials tend to retain specific capacity very well over many charge/discharge cycles. Importantly, this high specific capacity often is seen even at high discharge/charge rates. A second important advantage is that those batteries often exhibit high energies, due to a combination of high capacities and high operating voltages. Another significant advantage is that batteries containing these electrodes are capable of high charge rates.

Cathode materials of the invention preferably are made in a milling process, in which the various precursor materials described herein are milled together, followed by a calcining step. The milling step intimately mixes the precursors and in most cases reduces their particle size. Some reaction of the precursors may occur during the milling step, although it is believed that the final olivine structure does not fully develop until the calcining step is performed. Dry or wet milling methods can be used, as described more fully below.

BRIEF DESCRIPTION OF THE SEVERAL VIEWS OF THE INVENTION

[Not applicable.]

DETAILED DESCRIPTION OF THE INVENTION

The process of the invention is characterized in part by the ratios of the starting materials. The amounts of starting materials are conveniently expressed in terms of mole ratios of the metal ions (lithium, manganese, iron and dopant metal(s)) to $H_xPO_4$ ions.

The amount of lithium precursor provided is such that the mole ratio of lithium ions to $H_xPO_4$ ions is 1.025 to 1.15. This ratio preferably is 1.025 to 1.10, more preferably 1.04 to 1.10, still more preferably 1.04 to 1.08. In some embodiments, this ratio may be 1.025 to 1.075.

The amount of manganese precursor provided is such that the mole ratio of manganese ions to $H_xPO_4$ ions is 0.65 to 0.95. This ratio preferably is 0.70 to 0.95, more preferably 0.70 to 0.85, and in some embodiments may be 0.75 to 0.85.

The amount of iron precursor provided is such that the mole ratio of iron ions to $H_xPO_4$ ions is 0.049 to 0.349. This ratio preferably is 0.10 to 0.30 and in some embodiments may be 0.15 to 0.25.

The amount of dopant metal precursor provided is such that the mole ratio of dopant metal ions to $H_xPO_4$ ions is 0.001 to 0.10. This ratio preferably is 0.005 to 0.10, more preferably 0.01 to 0.075 and in some embodiments may be 0.02 to 0.06.

In addition, the amount of lithium, manganese, iron and dopant metal precursors are chosen together. The mole ratio of lithium, manganese, iron and dopant metal ions combined to $H_xPO_4$ ions is such that (2.75×Moles $H_xPO_4$)≤[moles Li+(2×moles Mn)+(2×moles Fe)+(d×moles Dopant Metal)]≤(3.10×Moles $H_xPO_4$), where d is the valence of the doping metal(s). The value of [moles Li+(2×moles Mn)+(2×moles Fe)+(d×moles Dopant Metal)] preferably is not equal to 3.00. In some embodiments, [moles Li+(2×moles Mn)+(2×moles Fe)+(d×moles Dopant Metal)] is (2.85 to 2.99×Moles $H_xPO_4$) or (3.01 to 3.05×Moles $H_xPO_4$). In particular embodiments, [moles Li+(2×moles Mn)+(2×moles Fe)+(d×moles Dopant Metal)] is (2.95 to 2.98×Moles $H_xPO_4$) or (3.01 to 3.05×Moles $H_xPO_4$).

In specific embodiments:

1) the mole ratio of lithium ions to $H_xPO_4$ ions is 1.025 to 1.10, the mole ratio of manganese ions to $H_xPO_4$ ions is 0.70 to 0.95; the mole ratio of iron ions to $H_xPO_4$ ions is 0.049 to 0.349, the mole ratio of dopant metal ions to $H_xPO_4$ ions is 0.005 to 0.10 and [(2×moles Mn)+(2×moles Fe)+(d×moles Dopant Metal)] is (1.92 to 2.01×Moles $H_xPO_4$);

2) the mole ratio of lithium ions to $H_xPO_4$ ions is 1.04 to 1.08, the mole ratio of manganese ions to $H_xPO_4$ ions is 0.70 to 0.95; the mole ratio of iron ions to $H_xPO_4$ ions is 0.049 to 0.349, the mole ratio of dopant metal ions to $H_xPO_4$ ions is 0.005 to 0.10 and [(2×moles Mn)+(2×moles Fe)+(d×moles Dopant Metal)] is (1.92 to 2.01×Moles $H_xPO_4$);

3) the mole ratio of lithium ions to $H_xPO_4$ ions is 1.025 to 1.10, the mole ratio of manganese ions to $H_xPO_4$ ions is 0.70 to 0.85; the mole ratio of iron ions to $H_xPO_4$ ions is 0.15 to 0.25, the mole ratio of dopant metal ions to $H_xPO_4$ ions is 0.02 to 0.10 and [(2×moles Mn)+(2×moles Fe)+(d×moles Dopant Metal)] is (1.92 to 2.01×Moles $H_xPO_4$).

4) the mole ratio of lithium ions to $H_xPO_4$ ions is 1.04 to 1.08, the mole ratio of manganese ions to $H_xPO_4$ ions is 0.70 to 0.85; the mole ratio of iron ions to $H_xPO_4$ ions is 0.15 to 0.25, the mole ratio of dopant metal ions to $H_xPO_4$ ions is 0.02 to 0.10 and [(2×moles Mn)+(2×moles Fe)+(d×moles Dopant Metal)] is (1.92 to 2.01×Moles $H_xPO_4$).

In specific embodiments 1) through 4), the dopant metal is preferably cobalt, magnesium or a mixture of cobalt and magnesium.

Embodiments 1) through 4) exhibit some specific advantages, especially when prepared in a wet milling process. The cathode materials of embodiments 1) through 4) tend to be less hygroscopic, and therefore absorb less water. Other advantages of these embodiments can include higher ionic conductivity (perhaps due to the formation of lithium salts such as $Li_3PO_4$ and/or $Li_4P_2O_7$ and the like), higher charge acceptance, higher capacity and superior cycling stability.

In any of the foregoing embodiments the dopant metal is selected from one or more of magnesium, calcium, strontium, cobalt, titanium, zirconium, molybdenum, vanadium, niobium, nickel, scandium, chromium, copper, zinc, beryllium, lanthanum and aluminum. The dopant metal is preferably magnesium, cobalt, titanium, vanadium, nickel, or aluminum or a mixture of two or more thereof. The dopant metal is more preferably magnesium or a mixture of magnesium and with one or more of calcium, strontium, cobalt, titanium, zirconium, molybdenum, vanadium, niobium, nickel, scandium, chromium, copper, zinc, beryllium, lanthanum and aluminum. The dopant metal is most preferably cobalt, magnesium, or both cobalt and magnesium.

The precursor materials are compounds other than a LMFP, and are compounds which react to form a LMFP as described herein. Some or all of the precursor materials may be sources for two or more of the necessary starting materials. Suitable lithium precursors include, for example, lithium hydroxide, lithium oxide, lithium carbonate, lithium dihydrogen phosphate, lithium hydrogen phosphate and lithium phosphate. Lithium dihydrogen phosphate, lithium hydrogen phosphate and lithium phosphate all function as a source for both lithium ions and $H_xPO_4$ ions, and can be formed by partially neutralizing phosphoric acid with lithium hydroxide prior to being combined with the rest of the precursor materials.

Suitable manganese precursors include manganese (II) compounds such as, for example, manganese (II) phosphate, manganese (II) hydrogen phosphate, manganese (II) dihydrogen phosphate, manganese (II) carbonate, manganese (II) hydrogen carbonate, manganese (II) formate, manganese (II) acetate, manganese (II) oxide, manganese (II) glycolate, manganese (II) lactate, manganese (II) citrate and manganese (II) tartrate. Manganese (II) hydrogen phosphate and manganese (II) phosphate will also function as all or part of the precursor for $H_xPO_4$ ions, and can be formed by partially neutralizing phosphoric acid with manganese metal prior to being combined with the rest of the precursor materials.

Suitable iron precursors include iron (II) phosphate, iron (II) hydrogen phosphate, iron (II) dihydrogen phosphate, iron (II) carbonate, iron (II) hydrogen carbonate, iron (II) formate, iron (II) acetate, iron (II) oxide, iron (II) glycolate, iron (II) lactate, iron (II) citrate, iron (II) tartrate. Iron (II) hydrogen phosphate and iron (II) phosphate will also function as all or part of the precursor for $H_zPO_4$ ions, and can be formed by partially neutralizing phosphoric acid with iron metal prior to being combined with the rest of the precursor materials.

Suitable precursors for the dopant metal include, for example, phosphate, hydrogen phosphate, dihydrogen phosphate, carbonate, formate, acetate, glycolate, lactate, tartrate, oxalate, oxide, hydroxide, fluoride, chloride, nitrate, sulfate, bromide and like salts of the various dopant metals. Examples include, for example, magnesium sulfate, magnesium phosphate, magnesium hydrogen phosphate, magnesium dihydrogen phosphate, magnesium carbonate, magnesium formate, magnesium acetate, cobalt (II) sulfate, cobalt (II) phosphate, cobalt (II) hydrogen phosphate, cobalt (II) dihydrogen phosphate, cobalt (II) carbonate, cobalt (II) formate, cobalt (II) acetate. The phosphates, hydrogen phosphates and dihydrogen phosphates in the foregoing list will in addition to serving as a source of the dopant metal ion also will serve as some or all of the source of $H_xPO_4$ ions.

Suitable precursors for $H_xPO_4$ ions include, in addition to the hydrogen phosphate and dihydrogen phosphate compounds listed above, phosphoric acid, tetraalkyl ammonium phosphate compounds, tetraphenyl ammonium phosphate compounds, ammonium phosphate, ammonium dihydrogen phosphate, and the like.

A carbonaceous material or precursor thereof may be included in the mixture that is taken to the milling step. Suitable carbonaceous materials and precursors include, for example, graphite, carbon black and/or other conductive carbon, various organic polymers, sugars such as sucrose or glucose, and the like.

In the milling process of the invention, the precursors typically are mixed in the presence of water or water/solvent mixture to form a slurry or thick paste. The precursors are typically added as solids, except that phosphoric acid (if used as the source of $H_xPO_4$ ions) is typically added as a concentrated aqueous solution. The solids content of this initial mixture may be, for example, from 25 to 60 weight percent. If the precursors react to form gaseous reaction by-products, it is generally preferred to permit the slurry to stand for a period to allow the gaseous by-products to liberate. Gaseous by-products often form, for example, when carbonate and/or carboxylate precursors are used. In a preferred process, the manganese, iron and dopant metal precursors are slurried with phosphoric acid, gaseous by-products are liberated, and then lithium hydroxide is added. The lithium hydroxide addition typically results in an exothermic reaction and a thickening of the slurry. It is believed that a mixture of intermediate reaction products such as $MnHPO_4$, $Li_3PO_4$, $Li_2HPO_4$, $LiH_2PO_4$, hurealite ($Mn^{2+}{}_5(PO_3OH)_2(PO4)_2 \cdot 4H_2O$), and $Fe(C_2O_4)$ may form at this stage.

The milling step can be carried out in a wet or dry agitated media mill, such as a sand mill, ball mill, attrition mill, mechanofusion mill, or colloid mill. The mill is preferably a recirculating type, necessitating a carrier liquid which is preferably water. The milling can be performed in one or more steps to final particle size. In a two-step milling process, larger size grinding media such as 0.8-1.0 mm ceramic beads are initially used on the raw materials to provide a finely milled product having a particle size in the range of, for example, 0.2 to 1 microns. In the second step smaller grinding media such as 0.05 mm ceramic beads are used to further reduce the particle size into the range of, for example, 0.01 to 0.1 microns. In a single-step milling process, the raw materials are reduced in size to a product on the order of 0.01 to 0.1 micron in a single step.

The amount of milling energy used to mill the particles to the aforementioned particle sizes is typically 10 to 10,000 kW-h/ton (9.09 to 9091 kW-h/1000 kg) and preferably <500 kW-h/ton (<454.5 kW-h/1000 kg).

The milled product is calcined. Preferably, the milled materials are first suspended in a liquid diluent such as water and then spray dried to form secondary agglomerates of the primary milled particles. Each droplet sprayed into the drying chamber forms an aggregate of particles when dried. The size of this aggregate is related to the size of the droplet formed by the spray dryer atomizer. A suitable secondary aggregate size range is, for example, 2 to 25 microns (d50, by light scattering methods). These secondary aggregates (or the powders as received from the milling step) are then calcined to form the olivine phase. A suitable calcining temperature is 350 to 750° C. and preferably 500 to 700° C., for 0.1 to 20 hours and preferably 1 to 4 hours. Conditions are selected to avoid sintering the particles.

If a carbonaceous material or precursor thereof is present during the calcining step, the calcined particles will take the form of a nanocomposite of the olivine material and the carbonaceous material. The carbonaceous material may form a carbonaceous coating on the powdered particles, and/or form a layered composite therewith.

The cathode material in certain embodiments of the invention has the empirical formula $Li_aMn_bFe_cD_dPO_4$, based on the raw materials provided into the process. In this formula, a is a number from 1.025 to 1.15, preferably from 1.025 to 1.10, more preferably 1.04 to 1.1, still more preferably from 1.04 to 1.08. In some embodiments, a is 1.025 to 1.075. b is from 0.65 to 0.95, preferably 0.7 to 0.95, more preferably 0.70 to 0.85 and in some embodiments may be 0.75 to 0.85. c is from 0.049 to 0.349, preferably from 0.10 to 0.30 and more preferably 0.10 to 0.25. d is from 0.001 to 0.1, preferably from 0.005 to 0.1, more preferably 0.01 to 0.075 and in some embodiments may be 0.02 to 0.06. In some embodiments, the values of b, c and d are such that $1.92 \le (2b+2c+dV) \le 2.01$.

At least a portion of the cathode material has an olivine structure. The olivine structure is revealed using X-ray diffraction methods. It is preferred that at least 50%, more preferably at least 80% and still more preferably at least 95% of the weight of the electroactive material is a $Li_aMn_bFe_cD_dPO_4$ having an olivine structure.

The cathode material preferably is formed during the milling and calcining processes into particles that may have flake-like, rod-like, spherical, or other morphologies and preferably have primary particle sizes of 200 nm or below. Primary particles sizes are conveniently measured by scanning electron microscopy. Aggregate sizes are conveniently measured by light scattering methods.

The lithium transition metal olivine produced in the process is useful as an electrode material, particularly as a cathode material, in various types of lithium batteries, especially secondary (rechargeable) batteries. It can be formulated into electrodes in any convenient manner, typically by blending it with a binder, forming a slurry and casting it onto a current collector. The electrode may contain particles and/or fibers of an electroconductive material such as graphite, carbon black, carbon fibers, carbon nanotubes, metals and the like. The lithium transition metal olivine particles may be formed into a nanocomposite with graphite, carbon black and/or other conductive carbon using, for example, dry ball milling processes as described in WO 2009/127901 and/or a wet milling process. Such a nanocomposite preferably contains at least 70% by weight of the lithium transition metal olivine particles, more preferably at least 75% by weight thereof, and up to 30%, more preferably 10 to 25%, by weight of carbon.

Secondary batteries containing a cathode which includes electroactive material of the invention exhibit unexpectedly good capacity retention upon battery cycling (i.e., subjecting the battery to repeated charge/discharge cycles), while retaining specific capacity and rate performance. In a secondary (rechargeable) battery, the good capacity retention correlates to long battery life and more consistent performance of the battery as it is repeatedly charged and discharged. This good capacity retention is seen at ambient temperature (20-25° C.) and at somewhat elevated temperatures (40-50° C.) as are often produced during the operation of an electrical device that contains the battery (and to which energy is supplied by the battery).

Cycle life testing for purposes of this invention is done using full cells with graphite anodes in pouches. The anodes, cathodes and separators are cut. Current tabs are welded onto the electrode sheet, the separator is sandwiched between the electrode sheets, and the sandwiched layers are sealed under vacuum in an aluminum laminated film bag filled with electrolyte (1.15 M LiPF in ethylene carbonate/ethylmethylcarbonate (1:3 volume ratio)+2% vinylidene carbonate). The anode/cathode capacity ratio is kept between 1.1-1.2 to prevent lithium plating on to the anode and for good cycling performance. After sealing and assembly, the cells undergo the following formation cycle: $1^{st}$ cycle: C/20 to 4.2 V, C/100 cutoff (charge); rest 15 minutes at RT; C/20 to 2.7 V (discharge), $2^{nd}$ cycle: C/20-4.2 V, C/100 cutoff (charge); rest at 50° C. for 24 hours, and then degas at room temperature; C/20 to 2.7 V (discharge). After the formation cycle, the cells are cycled on a Maccor electrochemical tester at 50° C. under the following protocol: 1C to 4.2 C, C/20 cutoff (charge), rest 15 minutes; C/10 to 2.7 V (discharge).

Lithium batteries containing cathodes containing the electroactive material of the invention also exhibit good specific capacity, which is often close to theoretical. Specific capacity is measured using half-cells at 25° C. on electrochemical testing using a Maccor 4000 electrochemical tester or equivalent electrochemical tester, using in order discharge rates of C/10, 1C, 5C, 10C and finally C/10. The lithium transition metal olivine produced in accordance with the invention may have a specific capacity of at least 80%, at least 90% or even at least 93% of the theoretical capacity at 5C testing in coin cells. For example, a lithium transition metal olivine made in accordance with the invention may exhibit, for example, a specific capacity of at least 140 mAh/g, at least 150 mAh/g, at least 155 mAh/g or even at least 160 mAh/g at a C/10 discharge rate, which values are close to the theoretical value of approximately 170 mAh/g.

A lithium battery containing such a cathode can have any suitable design. Such a battery typically comprises, in addition to the cathode, an anode, a separator disposed between the anode and cathode, and an electrolyte solution in contact with the anode and cathode. The electrolyte solution includes a solvent and a lithium salt.

Suitable anode materials include, for example, carbonaceous materials such as natural or artificial graphite, carbonized pitch, carbon fibers, graphitized mesophase microspheres, furnace black, acetylene black, and various other graphitized materials. Suitable carbonaceous anodes and methods for constructing same are described, for example, in U.S. Pat. No. 7,169,511. Other suitable anode materials include lithium metal, lithium alloys, other lithium compounds such as lithium titanate and metal oxides such as $TiO_2$, $SnO_2$ and $SiO_2$, as well as materials such as Si, Sn, or Sb.

The separator is conveniently a non-conductive material. It should not be reactive with or soluble in the electrolyte solution or any of the components of the electrolyte solution under operating conditions. Polymeric separators are generally suitable. Examples of suitable polymers for forming the separator include polyethylene, polypropylene, polybutene-1, poly-3-methylpentene, ethylene-propylene copolymers, polytetrafluoroethylene, polystyrene, polymethylmethacrylate, polydimethylsiloxane, polyethersulfones and the like.

The battery electrolyte solution has a lithium salt concentration of at least 0.1 moles/liter (0.1 M), preferably at least 0.5 moles/liter (0.5 M), more preferably at least 0.75 moles/liter (0.75 M), preferably up to 3 moles/liter (3.0 M), and more preferably up to 1.5 moles/liter (1.5 M). The lithium salt may be any that is suitable for battery use, including lithium salts such as $LiAsF_6$, $LiPF_6$, $LiPF_4(C_2O_4)$, $LiPF_2(C_2O_4)_2$, $LiBF_4$, $LiB(C_2O_4)_2$, $LiBF_2(C_2O_4)$, $LiClO_4$, $LiBrO_4$, $LiIO_4$, $LiB(C_6H_5)_4$, $LiCH_3SO_3$, $LiN(SO_2C_2F_5)_2$, and $LiCF_3SO_3$. The solvent in the battery electrolyte solution may be or include, for example, a cyclic alkylene carbonate like ethyl carbonate; a dialkyl carbonate such as diethyl carbonate, dimethyl carbonate or methylethyl carbonate, various alkyl ethers; various cyclic esters; various mononitriles; dinitriles such as glutaronitrile; symmetric or asymmetric sulfones, as well as derivatives thereof; various sulfolanes, various organic esters and ether esters having up to 12 carbon atoms, and the like.

The battery is preferably a secondary (rechargeable) battery, more preferably a secondary lithium battery. In such a battery, the charge reaction includes a dissolution or delithiation of lithium ions from the cathode into the electrolyte solution and concurrent incorporation of lithium ions into the anode. The discharging reaction, conversely, includes an incorporation of lithium ions into the cathode from the anode via the electrolyte solution.

The battery containing a cathode which includes lithium transition metal olivine particles made in accordance with the invention can be used in industrial applications such as electric vehicles, hybrid electric vehicles, plug-in hybrid electric vehicles, aerospace vehicles and equipment, e-bikes, etc. The battery of the invention is also useful for operating a large number of electrical and electronic devices, such as computers, cameras, video cameras, cell phones, PDAs, MP3 and other music players, tools, televisions, toys, video game players, household appliances, medical devices such as pacemakers and defibrillators, among many others.

The following examples are provided to illustrate the invention, but are not intended to limit the scope thereof. All parts and percentages are by weight unless otherwise indicated.

Examples 1-3 and Comparative Samples A-D

Examples 1-3 and Comparative Samples A-D are prepared using a solid state process as described in WO 2009/144600.

TABLE 1

| Designation | Formula | a + 2b + 2c + dV |
|---|---|---|
| Comp. Sample A | $LiMn_{0.8}Fe_{0.2}PO_4$ | 3.0 |
| Comp. Sample B | $Li_{1.025}Mn_{0.8}Fe_{0.2}PO_4$ | 3.025 |
| Comp. Sample C | $Li_{1.1}Mn_{0.71}Fe_{0.24}PO_4$ | 3.0 |
| Comp. Sample D | $Li_{1.1}Mn_{0.76}Fe_{0.19}PO_4$ | 3.0 |
| Example 1 | $Li_{1.1}Mn_{0.8}Fe_{0.1}Mg_{0.05}PO_4$ | 3.0 |
| Example 2 | $Li_{1.1}Mn_{0.8}Fe_{0.08}Mg_{0.07}PO_4$ | 3.0 |

The resulting particles are mixed with vapor-grown carbon fibers and binder at a 93:2:5 weight ratio to form electrodes. The electrodes are given the same designations as the respective electroactive materials they contain (as indicated in Table 1 above).

Half cell specific capacities are measured at 20° C. at C/10 discharge rate. Newly made cells are cycled using a CC/CV charge protocol with 2 cycles at C/10 charge/discharge, followed by subsequent cycles at varying C-rates. Full cell cycle life is measured at elevated temperature (50° C.) at 1C/1C charge/discharge with CC/CV charging from 2.7 to 4.2V. Two formation cycles are done at room temperature (20° C.) at C/10 charge/discharge over the same voltage range prior to placing the cells at elevated temperature.

Example 1 retains about 83% of its initial specific capacity, Example 2 retains 90% of its initial capacity. Each of the Comparative Samples loses significantly more of its initial capacity on this testing. After 168 cycles, Examples 1-2 are equivalent even in absolute terms to the best of the Comparative Samples. Due to the superior capacity retention exhibited through the first 168 cycles, Examples 1-2 are expected upon additional cycling to exhibit higher specific capacities in absolute terms than any of the Comparative Samples.

The electroactive material of Examples 1 and 2 both contain more than 1 atom of lithium per phosphate group (a>1) and are doped. Comparative Sample A is not doped and contains only 1 atom of lithium per phosphate group (a=1). The electrode made from that material retains little more than 60% of its initial capacity after only 140 cycles, and has a lower specific capacity at that point than either of Examples 1 or 2.

Comparative Samples B, C and D each has an excess of lithium (a>1) but are not doped. The electrode made using these material loses capacity quite rapidly upon charge/discharge cycling, and demonstrates that increasing the amount of lithium by itself provides little benefit.

Examples 3-7 and Comparative Sample E

Olivine LMFP particles having the formulae indicated in Table 2 below are made using the following process. In a mix tank with a high shear agitator (or rotor stator mixer), iron oxalate dihydrate (solid) and manganese carbonate (solid) are slurried with water to a concentration of 35-45 wt-% solids. In cases in which a dopant metal is included, the dopant metal precursor is magnesium acetate and/or cobalt acetate. 85% Phosphoric acid is slowly metered by a pump into the mix tank. Carbon dioxide becomes liberated as the phosphoric acid reacts with the manganese carbonate. After the acid addition is finished, the slurry is given about 30 minutes to mix to allow the carbon dioxide to continue to off gas. Then, lithium hydroxide monohydrate (solid) is added to the mix tank. The slurry goes through a viscous phase as the lithium hydroxide mixes with the solids. The LiOH addition is exothermic and the temperature rises to 55-60° C.

Once well mixed, the slurries are milled with a series of two mills. The materials are first loaded into a Centex disk style mill. The milling media size is approximately 0.7-0.9 mm in diameter. Once the mill is running at steady conditions, cellulose acetate powder is loaded. Aminopropanol and citric acid are added to control viscosity. The milling is continued until the particles are reduced to less than 40 microns. The material is then transferred into a Buhler Micromedia mill with milling media having a size of 0.1-0.3 mm in diameter. The milling is continued until the particles are reduced to approximately 50 nm in diameter.

The milled samples are spray dried at 170° C. to agglomerate the small particles into micron sized balls having diameters of up to about 20 microns. The spray dried particles contain approximately 5% water. The spray dried particles are calcined under an atmosphere containing <100 ppm oxygen. The particles are heated from room temperature to 400° C. over three hours and held at 400° C. for one hour. The temperature is then increased to 650° C. over two hours and held at 650° C. for three hours. CO, $CO_2$, $H_2O$, acetic acid and tars are given off throughout the calcination process. The particles are then cooled to below 60° C. and sieved through a 44 micron sieve.

TABLE 2

| Designation | Formula | a + 2b + 2c + dV |
|---|---|---|
| Ex. 3 | $Li_{1.05}Mn_{0.75}Fe_{0.1}Mg_{0.07}Co_{0.01}PO_4$ | 2.87 |
| Ex. 4 | $Li_{1.05}Mn_{0.75}Fe_{0.24}Co_{0.01}PO_4$ | 3.05 |
| Ex. 5 | $Li_{1.05}Mn_{0.7}Fe_{0.23}Mg_{0.03}Co_{0.01}PO_4$ | 2.99 |
| Ex. 6 | $Li_{1.05}Mn_{0.75}Fe_{0.15}Mg_{0.04}Co_{0.01}PO_4$ | 2.95 |
| Ex. 7 | $Li_{1.05}Mn_{0.71}Fe_{0.19}Mg_{0.04}Co_{0.01}PO_4$ | 2.95 |
| Comp. Sample E | $Li_{1.05}Mn_{0.71}Fe_{0.24}PO_4$ | 2.95 |

Half-cell specific capacity at 25° C. is measured on each of electrode Examples 4-8 and for Comparative Sample A (Table 1) using a Maccor 4000 electrochemical tester. Testing is performed using half-cells using a charge/discharge rates 0.1C, 5C and 10 C. Results are as indicated in Table 3.

TABLE 3

| Sample Designation | Specific Capacity (mAh/g) | | |
|---|---|---|---|
| | 0.1 C | 5 C | 10 C |
| Ex. 3 | 145 | 128 | 117 |
| Ex. 4 | 155 | 135 | 108 |
| Ex. 5 | 146 | 128 | 113 |
| Ex. 6 | 148 | 120 | 100 |
| Ex. 7 | 147 | 123 | 105 |
| Comp. Sample A | 154 | 135 | 118 |

Half and full cell battery for Examples 3-7 and Comparative Sample E are assembled. The anode in each case is lithium (in the case of a half cell) and a commercially available graphite (in the case of a full cell), the anode/cathode capacity ratio is 1.1 to 1.2 for the full cells, and the total cathode density is 1.4-1.6 g/cm³. A commercially available separator is used with an electrolyte of a 1.15 molar LiPF solution in a 1:3 by weight mixture of ethylene carbonate and ethylmethylcarbonate that also contains 2% by weight vinylidene carbonate.

Discharge energies at ⅒C, 1C and 5C discharge rates are measured at 25° C. on each of half cell (lithium anode) using 2025 coin cell configurations. The cells were charged using a constant current (1⁄10 C-rate) to 4.25V, and then held at constant voltage of 4.25 until the current decays to C/100. The discharge is done at constant current (varying with different c-rates) with a voltage cutoff of 2.7V. The discharge energy is calculated as the product of the integrated capacity vs. voltage. Results are as indicated in Table 4.

TABLE 4

| Sample | Discharge Energy (W-h/kg) | | |
|---|---|---|---|
| Designation | 0.1 C | 1 C | 5 C |
| Ex. 3 | 577 | 535 | 470 |
| Ex. 4 | 587 | 540 | 450 |
| Ex. 5 | 570 | 530 | 450 |
| Ex. 6 | 577 | 525 | 430 |
| Ex. 7 | 570 | 525 | 440 |
| Comp. Sample E | 585 | 555 | 495 |

Full cell 50° C. cycling is performed on each of Battery Examples 3 through 7. Pouch cell configurations are used consisting of a single-side coated cathode and anode with a separator encased in a sealed pouch with electrolyte. Two formation cycles are done at room temperature, consisting of a constant current charge at 1⁄10 C-rate to 4.2V, with a constant voltage hold at 4.2V until the current decays to C/100. After a 5 minute rest, the cell is discharged at constant current (C/10) to a voltage cutoff of 2.7V. After the two initial cycles, the cell is moved to a 50° C. oven for cycling. The cycle test is done using a 1C constant current charge to 4.2V, with a constant voltage hold at 4.2V until the current decays to C/100. The discharge is done at 1C constant current with a 2.7V cutoff. Degassing of the pouch cell is done after 5 cycles at elevated temperature, by removal of the gases in the pouch and resealing of the pouch. Examples 3, 5, 6 and 7 all retain at least 80% of their initial capacity for 325 to 350 cycles at 50° C., 1C/1C cycling. Example 4 retains about 92.5% of its initial capacity only up to 250 cycles. These results, together with the results reported in Table 4, demonstrate the advantage of selecting the value of a+2b+2c+dV slightly below 3.00. Example 4, which has both excess lithium (a>1.0) and is Co doped but has an a+2b+2c+dV of 3.05, shows a greater loss of capacity at higher discharge rates and a faster loss of capacity on cycling than do the other examples, in which a+2b+2c+dV<3 and has both Mg and Co doping. Comparative Example E, which does not have any doping, exhibits poor cycle life, and can retain 80% of its capacity for fewer than 250 cycles.

Examples 8 and 9 and Comparative Samples E and F

Olivine LMFP particles having the formulae indicated in Table 5 below are made using the process described for Examples 1-3.

TABLE 5

| Designation | Formula | a + 2b + 2c + dV |
|---|---|---|
| Ex. 8 | $Li_{1.05}Mn_{0.75}Fe_{0.2}Mg_{0.02}Co_{0.01}PO_4$ | 3.01 |
| Ex. 9 | $Li_{1.05}Mn_{0.75}Fe_{0.15}Mg_{0.05}Co_{0.01}PO_4$ | 2.97 |
| Comp. Sample E | $Li_{1.05}Mn_{0.71}Fe_{0.24}PO_4$ | 2.95 |
| Comp. Sample F | $Li_{1.0}Mn_{0.75}Fe_{0.25}PO_4$ | 3.00 |

Half-cell specific capacity at 25° C. and discharge energy are measured for each of electrode Examples 8 and 9 and for Comparative Samples E and F as described before Results are as indicated in Tables 6 and 7.

TABLE 6

| Sample | Specific Capacity (mAh/g) | | | |
|---|---|---|---|---|
| Designation | C/10 | 1 C | 5 C | 10 C |
| Ex. 8 | 148 | 140 | 124 | 112 |
| Ex. 9 | 150 | 144 | 132 | 116 |
| Comp. Sample E | 147 | 139 | 118 | 93 |
| Comp. Sample F | 146 | 127 | 88 | 47 |

As can be seen from the data in Table 6, specific capacities are much higher for Examples 8 and 9 at higher discharge rates.

TABLE 7

| Sample Designation | CC/ (CC + CV) | $V_{ave}$ (discharge), C/10 | C/10 discharge energy (Wh/kg) | $V_{ave}$ (discharge), 5 C |
|---|---|---|---|---|
| Ex. 8 | 0.68 | 3.83 | 564 | 3.61 |
| Ex. 9 | 0.71 | 3.86 | 579 | 3.54 |
| Comp. Sample E | 0.70 | 3.85 | 565 | 3.45 |
| Comp. Sample F | 0.38 | 3.80 | 553 | 3.29 |

As seen from the data in Table 7, all four of the tested electrode materials provide similar average voltage and discharge energy at a low (C/10) discharge rate. However, at a high (5C) discharge rate, average operating voltage is significantly higher for Examples 8 and 9 than for the Comparatives.

Examples 10-15

Olivine LMFP particles having the formulae indicated in Table 8 below are made using the general method described for Examples 4-8 above.

TABLE 8

| Ex. No. | Formula | a + 2b + c + dV | 2b + c + dV |
|---|---|---|---|
| 10 | $Li_{1.04}Mn_{0.79}Fe_{0.16}Mg_{0.05}Co_{0.003}PO_4$ | 3.046 | 2.006 |
| 11 | $Li_{1.08}Mn_{0.79}Fe_{0.16}Mg_{0.05}Co_{0.003}PO_4$ | 3.086 | 2.006 |
| 12 | $Li_{1.04}Mn_{0.76}Fe_{0.15}Mg_{0.05}Co_{0.003}PO_4$ | 2.966 | 1.926 |
| 13 | $Li_{1.04}Mn_{0.76}Fe_{0.24}Co_{0.003}PO_4$ | 3.046 | 2.006 |
| 14 | $Li_{1.08}Mn_{0.76}Fe_{0.24}Co_{0.003}PO_4$ | 3.08 | 2.00 |
| 15 | $Li_{1.04}Mn_{0.73}Fe_{0.23}Co_{0.003}PO_4$ | 2.96 | 1.92 |

The conductivity, moisture absorption, surface area and pH of each of these materials are measured. In addition, electrodes are made and tested from each of these materials in the manner described with respect to Examples 1-3. Results are as indicated in Table 9.

TABLE 9

| Ex. No. | C/10 discharge capacity, mAh/g | 1 C, discharge capacity, mAh/g | Moisture content after 5 hours exposure to ambient conditions (ppm) | Conductivity, S/cm | Surface Area, m$^2$/g | pH |
|---|---|---|---|---|---|---|
| 10 | 151.0 | 146.0 | 4819 | $3.8 \times 10^{-6}$ | 33.9 | 10.2 |
| 11 | 146.4 | 140.4 | 5976 | $9.8 \times 10^{-8}$ | 37.5 | 10.3 |
| 12 | 148.7 | 144.8 | 5053 | $2.2 \times 10^{-5}$ | 26.2 | 10.0 |
| 13 | 150.0 | 142.5 | 6928 | $1.3 \times 10^{-6}$ | 26.2 | ND |
| 14 | 155.7 | 150.4 | 6916 | $1.5 \times 10^{-6}$ | 31.7 | ND |
| 15 | 153.9 | 147.1 | 3612 | $3.0 \times 10^{-5}$ | 19.5 | ND |

What is claimed is:

1. A particulate cathode material comprising an electroactive material having the empirical formula $Li_aMn_bFe_cD_dPO_4$, wherein
   a is a number from 1.04 to 1.08;
   b is from 0.73 to 0.79;
   c is from 0.15 to 0.24;
   d is from 0.003 to 0.053;
   $2.96 \leq (a+2b+2c+dV) \leq 3.086$ and $1.92 \leq (2b+2c+dV) \leq 2.01$, wherein V is the valence of D, and D is a metal ion selected from cobalt or a mixture of magnesium and cobalt, and further wherein at least a portion of the electroactive material has an olivine structure.

2. A nanocomposite containing at least 70% by weight of a particulate cathode material of claim 1 with up to 30% by weight of a graphite, carbon black and/or other conductive carbon.

3. A battery cathode comprising the nanocomposite of claim 2.

4. A lithium battery comprising an anode, a battery cathode of claim 3, a separator disposed between the anode and cathode, and an electrolyte solution containing at least one lithium salt.

5. A method for making an olivine lithium manganese transition metal phosphate cathode material, comprising
   a) forming a mixture of at least one lithium precursor, at least one iron precursor, at least one manganese precursor, at least one dopant metal precursor selected from a magnesium precursor, a cobalt precursor or a mixture of magnesium and cobalt precursors and at least one precursor of $H_xPO_4$ ions where x is 0, 1 or 2, wherein the precursors are present in amounts such that:
   the mole ratio of lithium ions to $H_xPO_4$ ions is 1.04 to 1.08;
   the mole ratio of manganese ions to $H_xPO_4$ ions is 0.73 to 0.79;
   the mole ratio of iron ions to $H_xPO_4$ ions is 0.15 to 0.24;
   the mole ratio of dopant metal ions to $H_xPO_4$ ions is 0.003 to 0.053; and
   the mole ratio of lithium, manganese, iron and dopant metal ions combined to $H_xPO_4$ ions is such that $(2.96 \times \text{Moles } H_xPO_4) \leq [\text{moles Li} + (2 \times \text{Moles Mn}) + (2 \times \text{Moles Fe}) + (2 \times \text{Moles Dopant Metal})] \leq (3.086 \times \text{Moles } H_xPO_4)$ and $(1.92 \times \text{Moles } H_xPO_4) \leq [(2 \times \text{Moles Mn}) + (2 \times \text{Moles Fe}) + (2 \times \text{Moles Dopant Metal})] \leq (2.006 \times \text{Moles } H_xPO_4)$;
   b) milling the mixture and then;
   c) calcining the milled mixture to form the olivine lithium manganese iron phosphate cathode material.

* * * * *